DATA PROCESSOR WITH IMPROVED PROGRAM LOADING OPERATION
Filed March 24, 1966
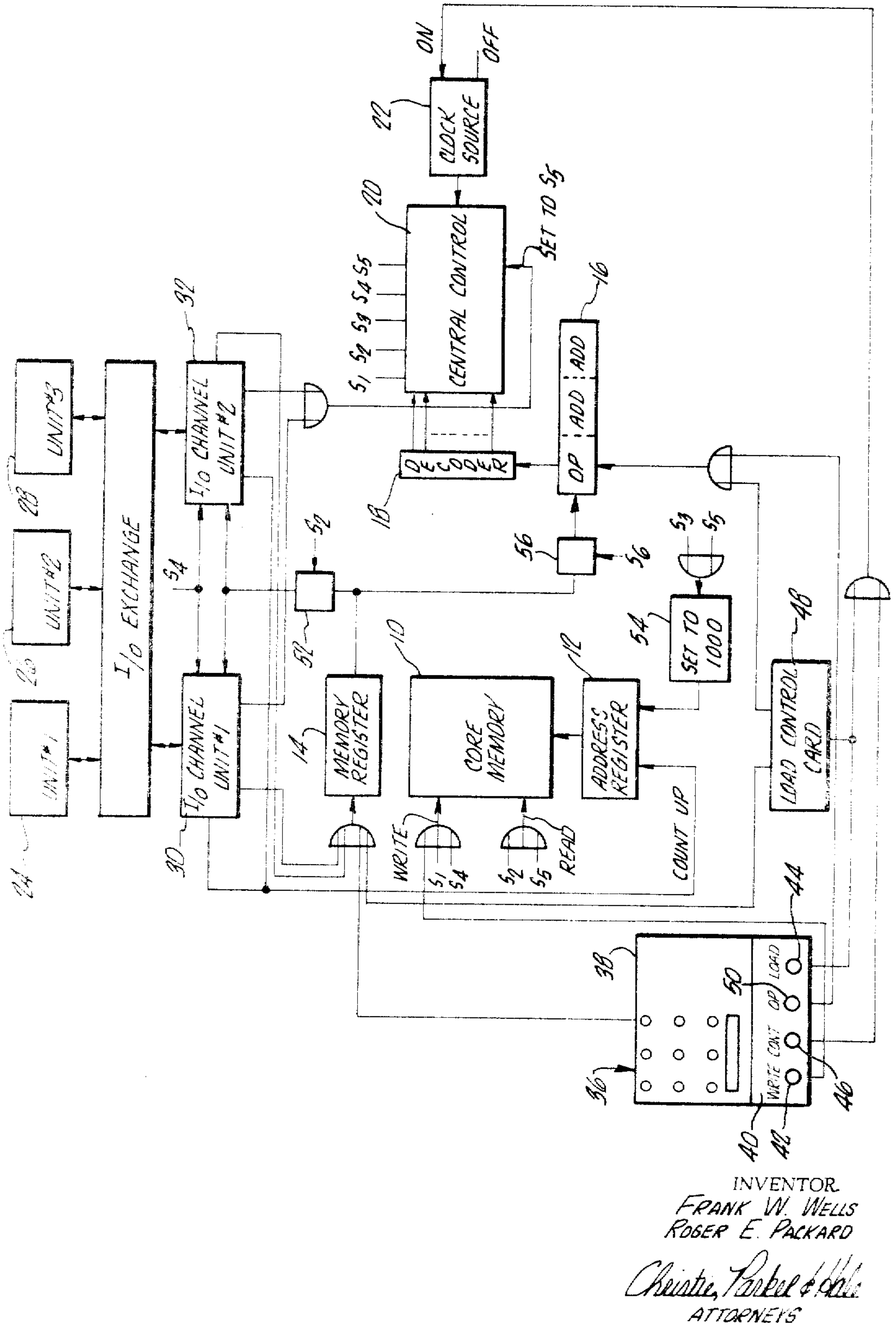
INVENTOR.
FRANK W. WELLS
ROGER E. PACKARD
Christie, Parker & Hale
ATTORNEYS United States Patent Office 3,427,593
Patented Feb. 11, 1969

3,427,593

DATA PROCESSOR WITH IMPROVED PROGRAM LOADING OPERATION

Frank W. Wells, Sierra Madre, and Roger E. Packard, Glendora, Calif., assignors to Burroughs Corporation, Detroit, Mich., a corporation of Michigan Filed Mar. 24, 1966, Ser. No. 537,149
U.S. Cl. 340—172.5 9 Claims
Int. Cl. G11b *13/00;* G06f *1/00*

ABSTRACT OF THE DISCLOSURE

There is described an arrangement by which instructions can be initially loaded into a high-speed memory from any one of a number of peripheral units in a computing system which normally requires a master control program to control the transfer of data between the peripheral units and memory. A keyboard control loads the necessary information in memory to effect the transfer of specified data from any designated peripheral unit to a predetermined portion of memory before the processors begin execution of any program.

This invention relates to data processing systems and, more particularly, is concerned with apparatus for initially loading a program segment into a data processor from any one of a plurality of selected input units.

In modern complex data processing systems with facilities for multi-processing, multi-programming, modular input and output configurations, automatic programming facilities, and other automatic features, many of the so-called "housekeeping" operations necessary to maintain automatic operation are carried out by execution of special instructions. These instructions make up what is known as the Master Control program and are useful in providing for such things as assigning memory space to specific programs, assigning input/output channels, handling interrupt conditions, and many other routine operations necessary to provide continuous automatic operation of a multi-processing system.

Since many operations of the computer depend upon proper programming and since the instructions in an object program can only be generated and loaded into the processor in response to instructions in the Master Control program, the problem of setting up a multi-processing system initially must be solved by a "bootstrap" type of operation in which a group of instructions are initially loaded in the processor in a way to permit the processor to go forward and load the Master Control program and start operation on an object program. In the past, the initial "bootstrap" program segment is loaded into memory from one peripheral input unit, usually a card reader. The program segment, for example, may comprise the contents of a single card which can be transferred into memory starting with some predetermined address location by means of a manually operated load control button on the computer console. However, not infrequently, it is desirable to be able to load the bootstrap program segment into memory from some other source. For example, a particular user may prefer to always load from a disk file instead of a card reader. Also a user may desire to be able to select on occasion a different peripheral unit other than the one normally assigned for the load operation.

The present invention is directed to a data processing system in which any one of a plurality of peripheral units may be assigned to the load operation by a simple wiring change at the time of installation, permitting the system to be tailored to the requirements of different users. At the same time, the system permits the user to load from any other peripheral units in the system by keying in information, using a manual keyboard, designating any one of a plurality of peripheral units for the initial load operation. The processor of the present invention therefore provides two methods of loading, hereinafter referred to as Normal Load and Universal Load respectively.

It provides an improvement over the computer system of the type described in Patent 3,200,380—MacDonald et al. wherein a number of processors communicate through a switch interlock with a plurality of memory modules and in which the memory modules communicate with peripheral units through the same switch interlock under control of I/O channel control units, which are in effect also processors but with the limited function of controlling transfer of data between the peripheral units and memory. The processors and I/O channel control units in such a computer operate substantially independently of each other under the Master Control program stored in one of the memory modules. Under such an arrangement, the Master Control program must be loaded in memory before the processors or I/O channel control units can function, so that special provision is required to first load the Master Control program in memory. This has heretofore been done by a wired-in arrangement that permits one particular peripheral unit to be used to directly load one of the memory modules. For example, one channel on a disc file may be used.

The present invention permits a memory module to be loaded from any peripheral unit by the keyboard on one of the processors or to load automatically from one peripheral unit selected by wired-in logic of a single circuit card which can be easily changed to permit use of any selected peripheral unit.

In brief, the present invention is directed to a processor having a plurality of peripheral input units. Apparatus is provided for initiating operation of the processor by loading a bootstrap program segment into a predetermined location in memory, the bootstrap program segment then being used to enter any program into the processor. The load operation can be from one peripheral unit in response to the operation of a single load button or may be from any selected peripheral unit in response to keyed-in information. Whether in response to a keying operation or to the pressing of the load button, a coded word specifying the load operation is established in the instruction register of the processor. Information specifying the input/output channel and the input/output operation, e.g., card reader input, is stored in the addressable memory of the processor. The load operation is then executed by the processor using the channel designation information stored in memory to establish a communication link between memory and the selected input/output channel and using the input/output operation information stored in memory to initiate a read-in from a selected peripheral unit to memory. At the completion of the transfer, the load operation is complete and a fetch cycle is initiated to fetch the first instruction in the segment transferred to the memory from the peripheral unit and start operation of the processor.

For a more complete understanding of the invention, reference should be made to the accompanying drawing wherein the single figure is a block schematic diagram showing an embodiment of the present invention in a processing system.

Referring to the drawing in detail, the numeral 10 indicates generally an addressable core memory having an address register 12 for addressing word locations in the core memory 10 and a memory register 14 which acts as a buffer register for transferring words into and out of the core memory 10. A Write input causes a word to be transferred from the memory register 14 to a location in the core memory 10 specified by the contents of the address register 12. Similarly, a Read input causes a word in the core memory 10 to be transferred from the location specified by the address register 12 into the memory register 14.

A register 16 is used to store the instruction being executed by the processor. The instruction register includes a section OP in which the operation to be performed is specified in coded form. In addition, the instruction register 16 stores one or more addresses which may be used in conjunction with the execution of the instruction. The OP code is applied to a decoding circuit 18, the output of the decoder 18 being applied to a central control unit 20. The central control unit 20 in response to the output from the decoder circuit 18 and in synchronism with a clock source 22 sequences through a plurality of steps which are used within the processor to execute the instruction stored in the register 16. Only those states necessary to the load operation of the present invention are hereinafter described and are designated as $S_1$, $S_2$, etc. in the figure.

As pointed out above, in the Normal Load operation, the core memory 10 is loaded with a "bootstrap" program segment derived from a predetermined one of a pluraltiy of peripheral units, three of which are indicated at 24, 26, and 28. The peripheral units may communicate with the processor through one or more I/O channel units, two of which are indicated at 30 and 32, through an I/O exchange 34. Such an input/output arrangement is described in more detail in Patent No. 3,200,380—MacDonald et al. Each I/O channel unit includes a register which stores information as to the type of input/output operation, e.g., a card reading operation, designates one of the peripheral units, stores the base address in memory to which the information is being transferred from the peripheral unit, and the number of words to be transferred.

Initiation of the load operation is from the console, indicated generally at 36, which includes a ten key digital section 38 and a control button section 40, the latter including a Write button for initiating a Write operation in the core memory 10, a Load button 44 for initiating a Normal Load operation, and a Continue button 46 for initiating a Universal Load operation.

Considering first the Normal Load operation, when it is desired to load the "bootstrap" program segment into the processor, the program instructions are stored in a specified one of the peripheral units. For example, the Normal Load operation initiated by the Load button 44 may load the processor from peripheral unit No. 1 through I/O channel No. 1 only. While the load operation may be set up to take place from other peripheral units through other I/O channels, this can only be done, as hereinafter will be apparent, through a wiring change in the computer system made by a field engineer.

When the Load button 44 is actuated, all of the registers in the processor are cleared, which means that the address register 12 is initially pointing at momery location 0000. At the same time, the clock source 22 is turned on to start operation of the processor. Actuation of the Load button 44 sends a signal to a load control card 48 which preferably is a printed circuit card, for example, that provides binary coded levels to the OP section of the instruction register 16 and to the memory register 14. By replacing the card, a different pattern of levels generates a different coded word in the register 14. The code in the instruction register 16 designates the load operation and when decoded by the decoder 18 and applied to the central control 20, sets the central control to the $S_1$ state. The load control card 48 establishes a word in the memory register 14 which designates the I/O channel, e.g., I/O channel No. 1, designates the I/O operation and the peripheral unit from which the load operation is to take place, and the number of words to be transferred to memory. This information can be modified by replacing the load control card 48.

In the Universal Load operation, the load control card 48 is not used but the keyboard 38 of the console 36 is used to manually establish the I/O channel and the peripheral unit to be used in the load operation as well as the I/O operation and number of words to be transferred. First, the digits designating the I/O channel, the peripheral unit, the I/O operation and the number of words, are manually keyed in on the keyboard 38. This information is then transferred to the memory register 14 by operating the Write button 42. Next, the OP code for the load operation is keyed in on the keyboard 38 and this is transferred to the OP section of the instruction register 16 by actuating an OP button 50 on the console. At this time, the Continue button 46 on the console is pressed, which starts the clock source 22, placing the central control unit 20 in the $S_1$ state as in the Normal Load operation described above. From this point forward, both the Universal Load and the Normal Load operations are identical.

During the $S_1$ state, memory location 0000 in the core memory 10 is loaded with the information in the memory register 14. At the completion of the $S_1$ state, the central control unit 20 is advanced by the next clock pulse to the $S_2$ state.

During the $S_2$ state, the information in address location 0000 of the core memory 10 is read out of the core memory 10 into the memory register 14 and transferred by a gate 52 to the registers in the I/O channel units. To this end, the $S_2$ level is applied to the Read input of the memory 10 and to the gate 52. A portion of the word read out of memory to the I/O channels units designates the particular I/O channel unit, activating that unit and establishing a communication link between the designated I/O channel unit and the memory 10 in the manner described in detail in the above-identified patent. The information designating the peripheral unit is stored in the register in the I/O channel unit together with the I/O operation and the number of words to be transferred. This information having been stored in the register in the I/O channel unit, the central control 20 advances to the $S_3$ state with the next clock pulse.

During the $S_3$ state, the address register 12 is set to a predetermined address which is the base address for the "bootstrap" program segment which is to be transferred from the peripheral unit to the core memory. For example, this may be address 1000, which is set in the address register 12 by a coding circuit 54 in response to the $S_3$ state.

When the central control advances with the next clock pulse, the $S_4$ state is entered and is applied to the I/O channel units 30 and 32, signalling to the selected I/O channel 30 to initiate read out from the identified peripheral unit No. 1 to the core memory. Under control of the I/O channel unit 30 during the $S_4$ state of the central control unit 20, words are transferred word by word from the peripheral unit 24 to a buffer register in the I/O channel 30 and from the buffer register to the memory register 14 and into successive locations in the core memory 10. The $S_4$ state places the core memory 10 in the Write condition and as each word is transferred from the I/O channel 30 to the core memory 10, the address register 12 is counted up one. This transfer operation is described in detail in the above-identified Patent No. 3,200,380. The central control 20 remains indefinitely in the $S_4$ state until the I/O channel unit 30 indicates that the specified number of words has been transferred from the peripheral unit to the core memory 10. The I/O channel unit 30 then puts out a signal which sets the central control 20 to the $S_5$ state.

During the $S_5$ state, the address register 12 is again set to the base address 1000 by the coding circuit 54 and a Read operation is initiated to place the contents of memory location 1000 in the memory register 14. The central control unit 20 then advances to the $S_6$ state in which the contents of the memory register 14 are transferred by a gate 56 to the instruction register 16. Thus the processor is supplied with the first instruction in the "bootstrap" program segment by which automatic operation of the computer is initiated. Operation then goes forward in the normal sequence of fetching and executing the instructions now loaded in the memory starting with base address 1000.

From the above description, it will be seen that the present invention provides a load operation for a processor capable of initially loading a group of instructions into the processor from any one of a plurality of peripheral units. The load operation may be from a particular peripheral unit determined by wired logic by operating a single button or may be from any other peripheral unit associated with the system by keying in the information designating the particular peripheral unit from which the "bootstrap" segment is to be loaded.

What is claimed is:

1. In a computer having at least one processor including a manual keyboard, a plurality of peripheral input/output units, a high-speed addressable memory, and at least one input/output channel control unit for controlling the transfer of data between the high-speed memory and the input/output units independently of the processor, apparatus for initially loading memory from any one of the peripheral units by means of the manual keyboard before the memory has any useful information stored therein, said apparatus comprising an operation register, manually operated means associated with the keyboard for initially setting the operation register to a predetermined coded condition designating a program load operation, manually operated means associated with the keyboard for initially loading a predetermined address location in memory with information designating one of the input units, control means responsive to the program load operation in the program register for reading the input designation information out of memory to the channel control unit, the channel control unit including means responsive to said designation information read out of memory for establishing a communication link between the designated input unit and the memory, means for transferring a series of data words stored in the designated input unit to the memory in sequential address locations starting with a predetermined address location, means indicating when the transferring means has completed the transfer from the input unit to the memory, and means responsive to said indicating means for addressing the first word in said series stored in memory at said predetermined address location when the transfer operation is complete.

2. Apparatus as defined in claim 1 wherein the manually operated means for initially loading information designating a particular input unit includes means operated from the digital keyboard for generating a plurality of electrically coded digits, and means for transferring a group of said digits from the keyboard to said predetermined address location in memory.

3. Apparatus as defined in claim 1 wherein the manually operated means for initially loading information designating a particular input unit includes a logic wiring circuit for generating a predetermined group of electrically coded digits, and a manual control switch on the keyboard for transferring a portion of said group of digits to said predetermined address location in memory.

4. Apparatus as defined in claim 1 further including means for generating a predetermined address, means in memory for storing said address at the start of the operation of said transferring means, and means for incrementing the address in memory as each word is stored in memory from the peripheral input unit.

5. In an internally programmed computer in which a number of peripheral units communicate with an addressable memory through an input/output control unit in response to coded descriptors that are generated by one or more processors, each processor being controlled by instructions that are normally brought out in sequence from the memory to an instruction register and then executed; apparatus for loading instructions into the memory initially from any selected one of a plurality of input units, comprising means responsive to actuation of a switch for generating a particular digital code condition in the instruction register of one of the processors for initiating a loading operation, means including a manually operated switch for generating and storing in a predetermined location in the memory a digital code condition identifying a peripheral unit when the switch is actuated, an input control unit for controlling the transfer of electrically coded information from any one of said plurality of input units to sequential locations in memory in response to said code condition identifying a peripheral unit, means responsive to said particular code condition in the instruction register for transferring said code condition in memory to the control unit, the control unit including means responsive to said code condition for coupling the identified input unit to the memory, and means responsive to the said code condition in the instruction register generating a base address in the memory unit, the control unit transferring a predetermined block of information from the input unit to memory in sequential address locations starting with said base address.

6. Apparatus as defined in claim 5 in which said means for generating and storing a code condition identifying an input unit includes means for transferring the code condition to a predetermined location in memory.

7. Apparatus as defined in claim 5 wherein said means for generating and storing a code condition identifying an input unit includes means under control of a human operator for selectively generating any one of a plurality of code conditions each identifying a different input unit.

8. Apparatus as defined in claim 6 wherein said means for generating and storing a code condition identifying an input unit includes means under control of a human operator for selectively generating any one of a plurality of code conditions each identifying a different input unit.

9. Apparatus as defined in claim 8 wherein said means under control of a human operator includes a digital keyboard.

References Cited

UNITED STATES PATENTS

| | | | |
|---|---|---|---|
| 3,142,043 | 7/1964 | Schrimpf | 340—172.5 |
| 3,200,380 | 8/1965 | MacDonald et al. | 340—172.5 |

OTHER REFERENCES

Jeenel, Programming for Digital Computers, 1959, pp. 374–383 relied on.

PAUL. J. HENON, *Primary Examiner.*

R. RICKERT, *Assistant Examiner.*